(12) United States Patent
Gosling et al.

(10) Patent No.: US 6,574,040 B1
(45) Date of Patent: Jun. 3, 2003

(54) METHOD AND APPARATUS FOR SUPPORTING ONE OR MORE SEAMLESS REAR PROJECTOR SCREENS

(75) Inventors: Geoff Gosling, Calgary (CA); Colin Blohm, Calgary (CA)

(73) Assignee: EvansConsoles Inc., Alberta (CA)

( * ) Notice: Subject to any disclaimer, the term of this patent is extended or adjusted under 35 U.S.C. 154(b) by 0 days.

(21) Appl. No.: 09/469,666

(22) Filed: Dec. 22, 1999

(30) Foreign Application Priority Data

Dec. 22, 1998 (CA) .............................................. 2256871

(51) Int. Cl.[7] .......................... G03B 21/56; H04N 5/64
(52) U.S. Cl. ...................... 359/443; 359/449; 359/450; 359/460; 348/840
(58) Field of Search .............................. 359/450, 443, 359/460, 449; 348/840

(56) References Cited

U.S. PATENT DOCUMENTS

| | | | | |
|---|---|---|---|---|
| 4,668,046 A | * | 5/1987 | Yatabe et al. ................ | 350/117 |
| 5,085,495 A | * | 2/1992 | Iwahara et al. .............. | 359/455 |
| 5,103,339 A | * | 4/1992 | Broome ....................... | 359/443 |
| 5,317,449 A | * | 5/1994 | Furuno et al. ............... | 359/443 |
| 5,640,272 A | | 6/1997 | Furuya et al. ............... | 359/457 |
| 5,676,441 A | * | 10/1997 | Takahashi ..................... | 353/94 |
| 6,081,375 A | * | 6/2000 | Furuya et al. ............... | 359/460 |
| 6,327,082 B1 | * | 12/2001 | Browning .................... | 359/443 |
| 6,335,829 B1 | * | 1/2002 | Van De Voorde ........... | 359/449 |

OTHER PUBLICATIONS

Patent Abstracts of Japan, Publication No. 08152677, Publ. Date Nov. 6, 1996 entitled Multivision Device—(Complete Japanese Abstract w/ English Translation of Cover Sheet).

* cited by examiner

Primary Examiner—Russell Adams
Assistant Examiner—Magda Cruz
(74) Attorney, Agent, or Firm—Notaro & Michalos P.C.

(57) ABSTRACT

There is described an improved system for retaining a video screen in a frame comprising a video screen, a frame for supporting the video screen along at least a portion of the screen's peripheral edges, and a mechanism for biasing the edges of the screen against the frame to hold the screen in position relative to the frame.

23 Claims, 6 Drawing Sheets

METHOD AND APPARATUS FOR SUPPORTING ONE OR MORE SEAMLESS REAR PROJECTOR SCREENS

FIELD OF THE INVENTION

This invention relates to a method and apparatus for supporting video screens and more particularly to a retention mechanism for an audiovisual screen or a plurality of such screens placed in abutment to form a video display wall.

BACKGROUND OF THE INVENTION

Audiovisual (A/V) systems used in amphitheaters, control rooms or large conference rooms may be separate systems which can be assembled and disassembled for movement between one location and another. Typically these types of audiovisual systems include a rear projection screen for viewing and an enclosure unit supporting the screen and placing the projector in proper alignment for projection of the video image onto a mirror which then directs the images onto the screen.

Often, there is a need for a large screen than can be provided by one audiovisual unit. Several units are then placed side by side for an enlarged viewing surface. However, due to the supporting structure and cabinetry around the screen of each audiovisual unit, there is a framing interruption between the screens of each unit resulting in a fragmentation of the projected image which disrupts viewing.

There is a need therefore for an audiovisual system in which the supporting structure of the audiovisual unit allows for multiple screens to be placed side by side resulting in a larger screen area with no apparent gaps or interruptions between screens, or ideally in the projected image itself, to give the appearance of one larger continuous screen.

Where an even larger image is required than can be obtained by placing two or more A/V units side-by-side, a video wall is constructed consisting of multiple screens arranged typically in a rectangular pattern of rows and columns of individual screens. This requires a framing system that allows the individual screens to be assembled together with minimal spacing between the adjacent edges of abutting screens and which can accommodate angular orientations between adjacent screens for a concave curvature of the video wall relative to the viewing audience if so desired.

One approach to the problem of framing a video wall is disclosed in U.S. Pat. No. 5,103,339 dates Apr. 7, 1992. The patented system includes front and rear brackets positioned at the front and back surfaces of the abutting screens adjacent to their vertical and horizontal edges, the brackets being held together by means of threaded fasteners passing between the abutting edges of the screens to connect the front and rear brackets together. This system requires the use of numerous discrete parts including the brackets and the threaded fasteners and requires considerable assembly time. Moreover, the front brackets have a substantial width highly visible to viewers that interrupts the continuity of the projected image, nor is the system adaptable for use in connection with discrete audiovisual units.

SUMMARY OF THE INVENTION

It is therefore an object of the present invention to provide a method and apparatus for supporting one or more rear projection screens in a manner intended to obviate and mitigate from the disadvantages of the prior art.

It is a further object of the present invention to provide a screen retaining mechanism that eliminates the gap between adjacent screens when placed in abutting relationship to one another.

It is a further object of the present invention to provide a framing and retention mechanism for video projection screens that minimizes the amount of assembly required to place the screens in close abutting relationship.

According to the present invention then, there is provided a system for retaining a video screen in a frame, comprising a video screen; frame means for supporting said video screen along at least a portion of the screen's peripheral edges; and means for biasing said edges of said screen against said frame means to hold said screen in position relative to said frame means.

BRIEF DESCRIPTION OF THE DRAWINGS

Preferred embodiments of the present invention will now be described in greater detail and will be better understood when read in conjunction with the accompanying drawings, in which.

DETAILED DESCRIPTION OF PREFERRED EMBODIMENTS

Figure 1:
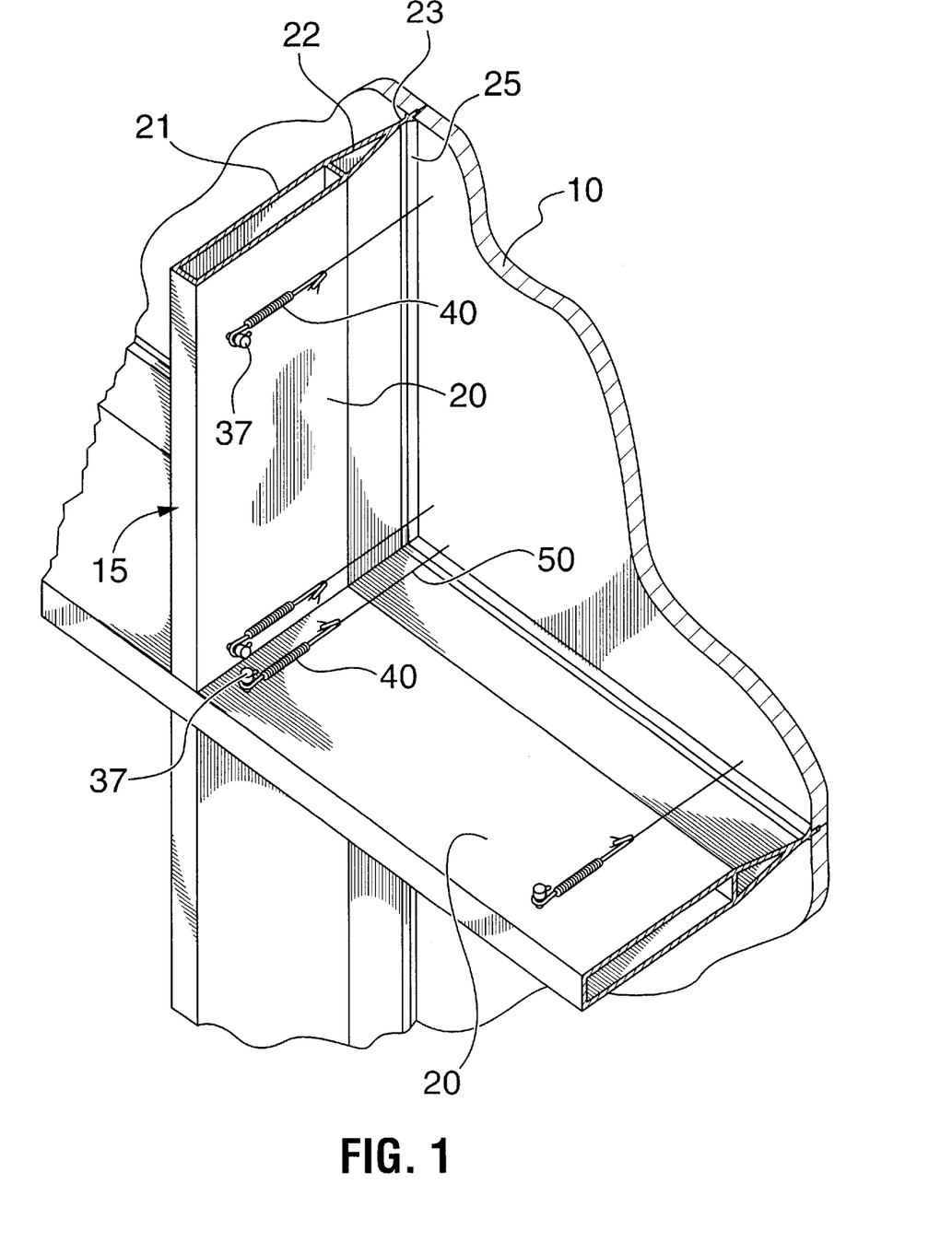
FIG. 1 is a perspective partially cut away view of the screen retention system of the present invention.

With reference to FIG. 1 of the drawings, one embodiment of the present invention comprises a screen retention system ideally suited for a large screen display system consisting of a plurality of rear projection screens arranged in a pattern of rows and columns. For purposes of illustration only, in one example contemplated by the applicant, eight screens are configured two high by four wide with each screen being 84 inches across its diagonal. The screens themselves will typically be cleanable, graphite gray density acrylic for a high contrast ratio. The screens may be fresnel-lenticular construction, diffusion or other types for high resolution, color corrected images.

As mentioned above, the problem with multiple screen video walls to date has been frame interruptions between the individual screens. To virtually minimize such interruptions, the applicant has developed a system in which adjacent screens abut one another directly with no intervening frame means and wherein the screens are held in place against a structural framework by means of tension applied through springs and cords.

Figure 2:
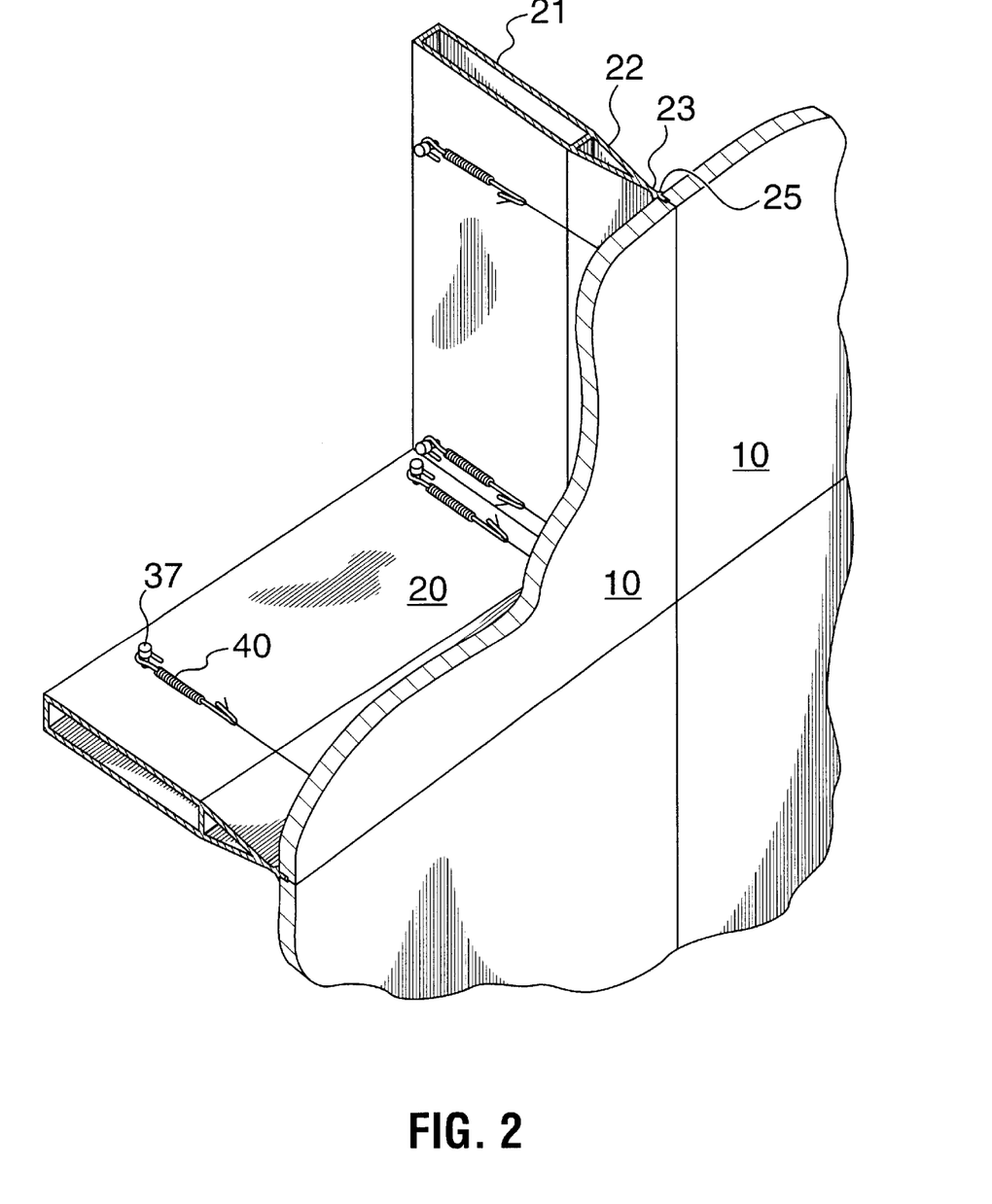
FIG. 2 is a reverse angle perspective view of the system of FIG. 1.
Figure 3:
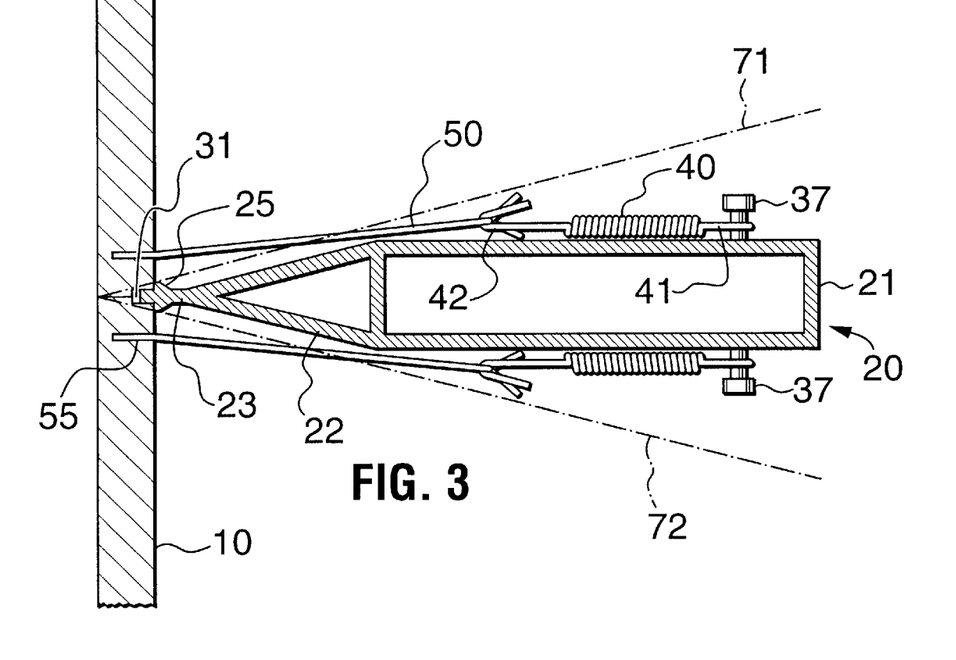
FIG. 3 is a cross-sectional view of one sector of the present invention system.

Referring now to FIGS. 1 to 3, individual screens 10 are shown supported against a structural framework 15. The framework can be metal, wood, plastic or any other material having the strength to provide sufficient rigidity and to support the weight of however many screens are to make up the video display wall. In one embodiment constructed by the applicant, the framework is made of extruded aluminum frame members 20. The extrusions can be manufactured inexpensively as a continuous extrusion, preferably from aluminum, and cut to the required lengths for constructing the frame matrix.

The frame members themselves consist of a rectangular inner section 21 and an outer screen 22 that tapers forwardly to merge into a forwardly extending flange 23 with a shoulder 25 that extends along the length thereof.

Figure 4:
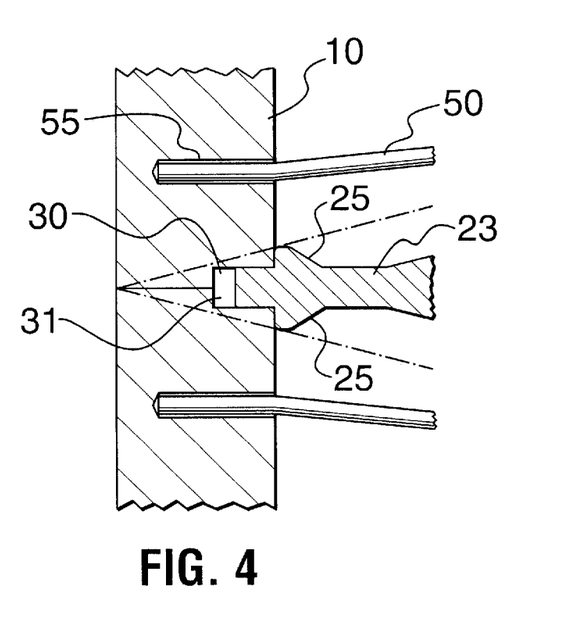
FIG. 4 is an enlarged view of a portion of the view of FIG. 3.

The peripheral edge of each screen along its rear surface is notched to form a locator notch 30 best seen in the enlargement of FIG. 4. With two screens abutting one another, the locator notches combine to form a larger rectangular notch 31 for engaging the outer end of flange 23. Flanges 23 therefore extend completely around the peripheral edge of each screen so that the weight of each screen is supported by framework 15 and the screens themselves from no part of the supporting structure, nor do they connect to or support one another. Nevertheless, the screens touch or come close to touching all along their connecting sides to form gapless, hairline joints without any framing interruptions.

To hold the screens against framing members 20 and particularly against shoulders 25 on flanges 23, the screens are pulled or biased into place. With reference to FIGS. 3 and 4, frame members 20 are fitted with a plurality of spaced apart pins 37 which anchor one end 41 of a tensioning spring 40. The spring's other end 42 is hooked to form a crux which captures, for example, a knot at one end of a loop of cord 50. The other end of the looped cord is attached to the lens. One means of accomplishing this is to solvent weld the cord into a pilot hole 55 drilled partially through the lens from its rear surface. The cord 50 is preferably nylon monofilament which, because of its translucent nature, will transmit at least some light to minimize any shadowing. The solvent used to weld the monofilament to the lens should also be carefully chosen for its strength and its light transmitting properties. A suitable solvent used by the applicant is CA 50 from the 3M Company. The solvent can be added to the pilot holes using a syringe prior to insertion of the monofilament. Enough adhesive is added so that upon insertion of the monofilament, the surface of the adhesive rises preferably no higher than to the level of the screen's rear surface. The pilot holes themselves can be drilled to a depth of approximately two-thirds of the thickness of the screens using a No. 60 drill bit.

This method of connecting the monofilament to the screen is particularly preferred in a single element screen system.

Figure 7:
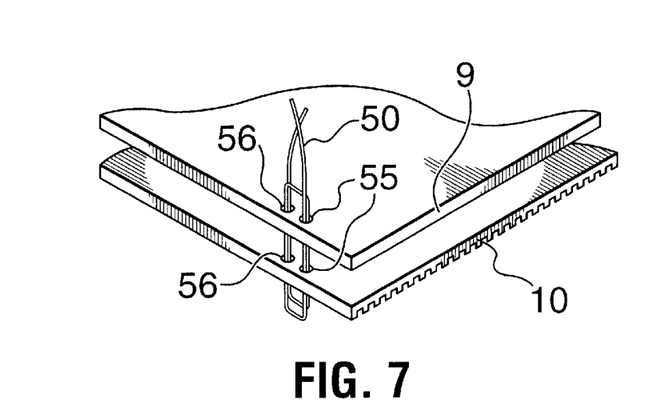
FIG. 7 is a perspective view of dual element screen with monofilament cord connected thereto.
Figure 8:
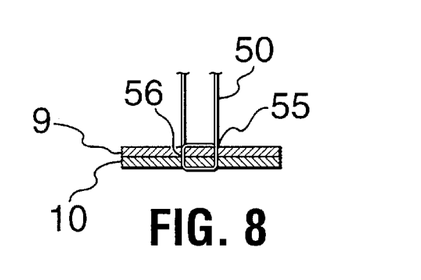
FIG. 8 is a side elevational view of the dual element screen of FIG. 7.

In some applications, a dual element screen, for example separate lenticular and Fresnel lenses layered together, is used. FIGS. 7 and 8 illustrate a method of connecting the monofilament to a dual element screen, and it will be appreciated that this same method can be used for single element screens, or screens having more than two elements.

As shown in FIG. 7, a pair of side by side holes 55 and 56 are formed in alignment through juxtaposed screens 9 and 10. The monofilament is run in through holes 55, out of holes 56, it's then looped back in through holes 55 and back out through holes 56 and tightened as shown in FIG. 8 to hold the two screens together. This method has the added advantage that the monofilament can be loosened and the screens separated to allow for the use of some padding between the lenses during shipping and handling. When connected to springs 40, the monofilament is self-tightening.

As will be appreciated, if shadowing of the screen is less of a concern, more direct methods can be used to pull the screens against the framing members. For example, small hooks can be attached to the pilot holes by threads or glue, and longer springs can be used that extend the distance between pins 37 and these hooks. Cord or wire can be used in place of a spring/cord combination, or a spring alone. Strong elastics, like bungee cords, can also be substituted. If the screen is held in place by a system that does not include a resilient tensioning member such as a spring, care should be taken to balance or equalize as best possible the amount of biasing force exerted by each cord or wire or whatever means is used.

With reference once again to FIGS. 3 and 4, the tapering of the outer portions 22 of members 20 and the width of shoulders 25 is selected so that light from adjacent projectors, indicated diagrammatically by broken lines 71 and 72, can converge just behind or at the front surface of the screens so that there is little or no shadowing of the projected images by the structural components.

Figure 5:
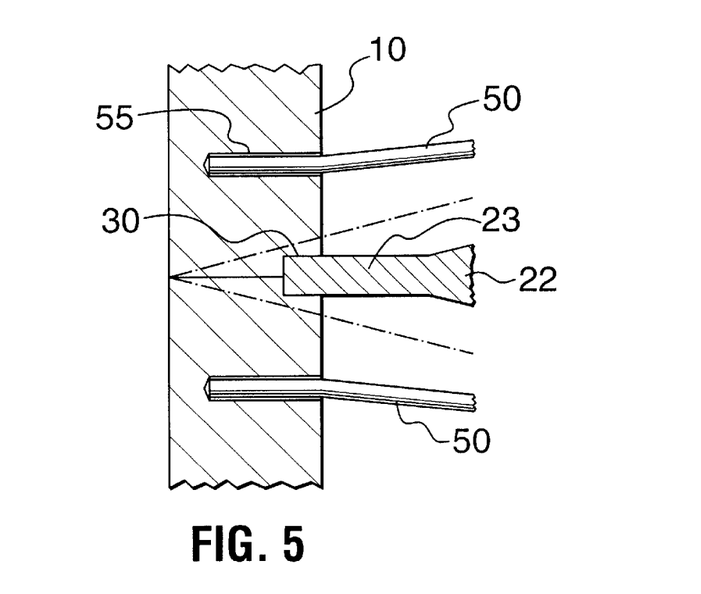
FIG. 5 is an enlarged view of a portion of the view of FIG. 3 showing a modified embodiment.
Figure 6:
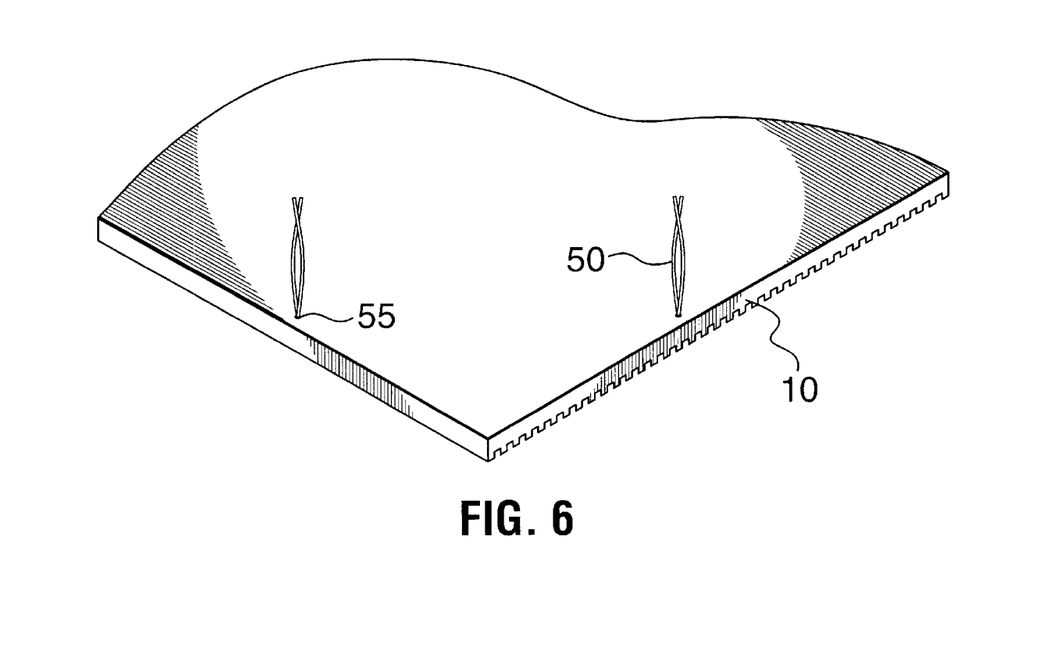
FIG. 6 is a perspective view of a screen with monofilament cord connected thereto.

The incorporation of a shoulder 25 on flange 23 is optional. The enlargement of FIG. 5, in which like numerals are used to identify like elements, shows the connection of the screens to flange 23 without use of a shoulder.

Figure 9:
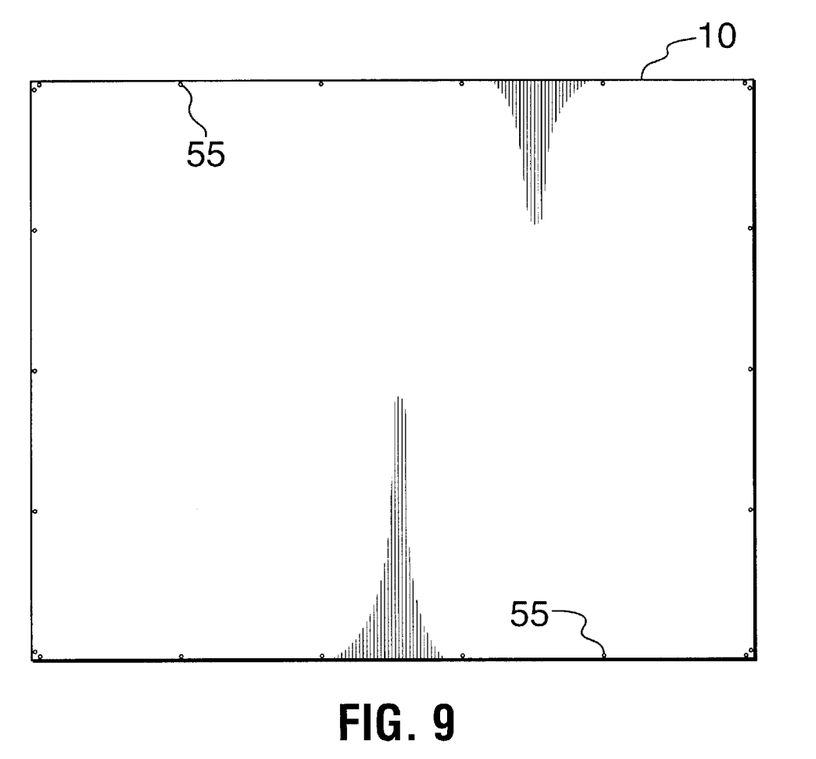
FIG. 9 is a rear elevational view of a screen with holes for the monofilaments.

FIG. 9 illustrates the placement of the pilot holes 55, or pairs of holes 55, 56, for connection of the monofilaments. Holes are closely spaced into the corners of the screen and the remaining holes are formed, for example, at 12 inch intervals along the screen's edges. Good results have been obtained using 0.020" diameter monofilament cord and miniature tempered high carbon steel springs.

Figures 10, 11:
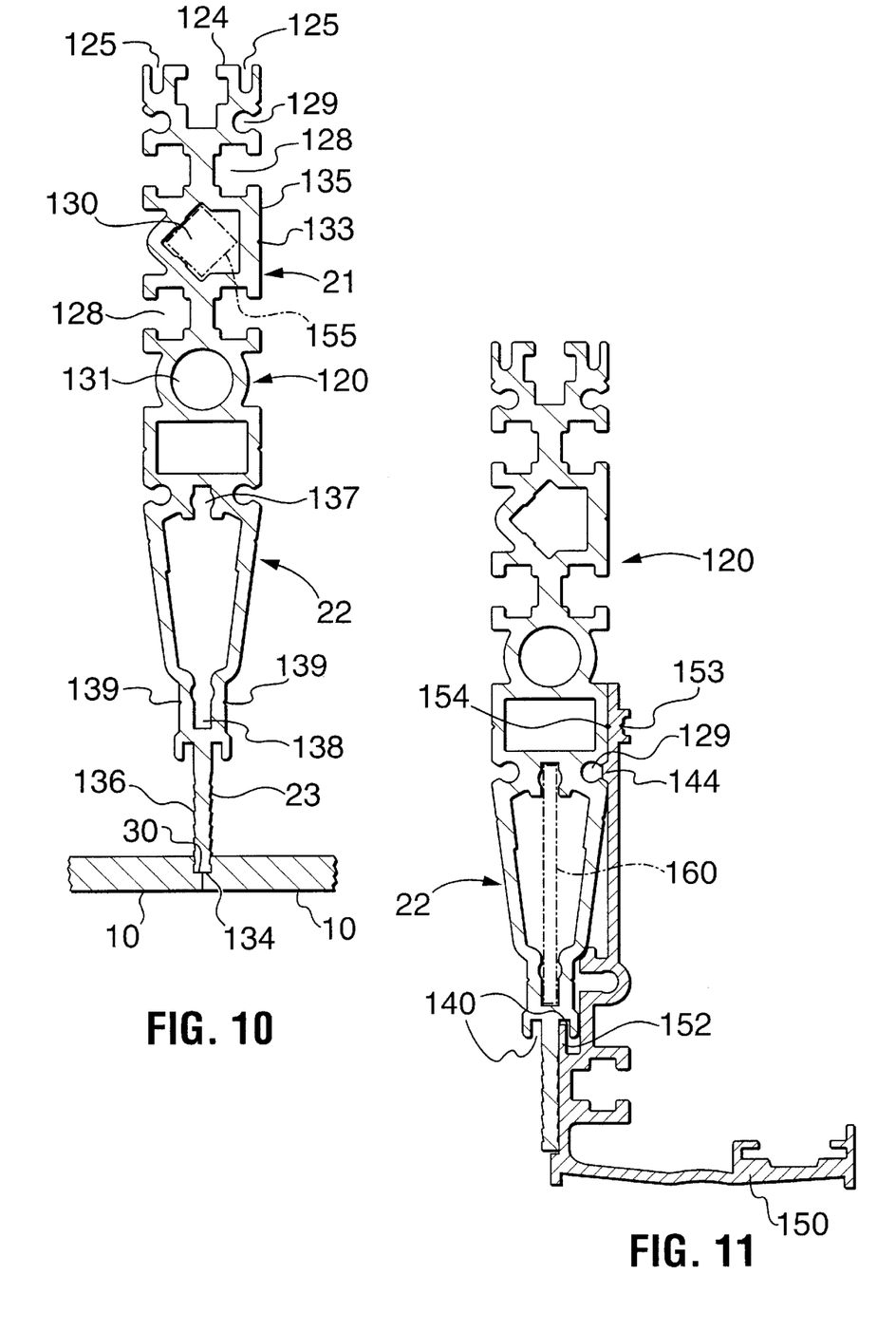
FIG. 10 is a cross-sectional view of a modified frame member for the present system.
FIG. 11 is a cross-sectional view of the frame member of FIG. 10 with an extrusion trim connected thereto.

FIG. 10 illustrates a modified extruded aluminum frame member 120. In this figure, like reference numerals are used to denote like elements. This modified member consists of the same basic configuration as member 20 and includes a rectangular inner section 21, forwardly tapering outer section 22 and a forwardly extending flange 23. Inner section 21 includes along its rear surface 124 a pair of longitudinally extending slots 125 that are used to engage ends 41 of springs 40 in place of pins 37. The inner section additionally includes a number of longitudinally extending T-slots 128, recesses 129 and apertures 130 and 131 useful for example for hardware used to connect the frame members into a screen supporting framework, to reinforce the framework's rigidity and to connect the framework to surrounding cabinetry.

For example, aperture 130 is adapted for the insertion of a squared tubing 155 (broken line) that aligns and connects the frame members together and that also prevents rotational movement of one member relative to the next. A small longitudinally extending groove 133 in outer surface 135 of the frame member can serve as a pilot for holes drilled for fasteners (not shown) that secure the squared tubing to the frame member.

Another means of providing a torsionally resistant connection between adjacent members is by means of a sheet metal spline 160 shown by dotted lines in FIG. 11 received into notches 137 and 138 inside forward section 22 of the frame member. Groove 139, like groove 133, serves as a convenient tap to spot holes drilled for fasteners to secure the spline to the frame member.

As will be seen, flange 23 can be elongated compared to the corresponding flange shown in FIG. 4. Nor does the flange include a shoulder 25. This longer flange therefore spaces the screen's 10 further forward relative to frame sections 21 and 22 and the notches 30 in the screen edges bear directly against the flange's tip 134. The flange is also ribbed as shown at 136. These ribs function to reflect back any light that strikes them instead of reflecting forwardly which might interfere with the projected image.

With reference to FIG. 11, frame member 120 is shown in combination with a trim extrusion 150 useful to close the gap between the assembled screens and the customer's wall. Trim strip 150 includes a flange 152 that hooks into one of notches 140 in forward section 22 of the frame member, and a small rib 144 that slots into one of recesses 129 as shown for registration and alignment purposes. Holes can be drilled at points 153 and 154 for as many spaced apart fasteners as are required to securely connect the trim strip to the frame member along their respective lengths.

The above-described embodiments of the present invention are meant to be illustrative of preferred embodiments and are not intended to limit the scope of the present invention. Various modifications, which would be readily apparent to one skilled in the art, are intended to be within the scope of the present invention. The only limitations to the scope of the present invention are set forth in the following claims appended hereto. As well the present system can be used for mounting and retaining members other than video screens. Examples include other light transmitting panels, opaque plates, decorative plates or panels or members of virtually any kind.

The embodiments of the invention in which an exclusive property or privilege is claimed are defined as follows:

1. A system for retaining a video screen in a frame, comprising:
    a video screen having a front, a back and a peripheral edge extending thereabout;
    frame means for supporting said video screen along at least a portion of said screen's peripheral edge, said peripheral edge including a continuous notch formed therein, said notch extending partially through said screen from the back to the front thereof, said notch being shaped to engage said frame means to locate said screen relative to said frame means;
    a plurality of spaced apart holes formed in said back of said video screen, said holes extending only partially through said screen from the back to the front thereof and being spaced inwardly of said notch; and
    means for resiliently biasing said screen against said frame means to hold said frame means in said notch, each biasing means having a first end connectable to said frame means and a second end connectable to said screen, wherein said second end of each said biasing means is connectingly received into a respective one of said holes in said back of said screen.

2. The system of claim 1 wherein said frame means comprise frame members for assembly into a screen supporting frame, each frame member having an inner and an outer portion, said outer portion including a substantially planer flange having side surfaces and an outer edge surface, said outer edge surface and the contiguous portion of at least one of said side surfaces being adapted to engage said notch in said screen.

3. The system of claim 2 wherein each of said biasing means includes a tensioning member at said first end thereof for pulling said notch in said screen against said flange of said frame means.

4. The system of claim 3 wherein each of said biasing means additionally includes a length of cord at said second end thereof, said tensioning member and said length of cord being connected together and being disposed between said frame means and a respective one of said hole in said screen for biasing said screen against said frame means.

5. The system of claim 4 wherein said tensioning member is a spring.

6. The system of claim 4 wherein said cord is light transmitting.

7. The system of claim 4 wherein said cord is adhesively connected to said respective one of said holes in said screen.

8. The system of claim 7 wherein each of said holes is adapted to receive therein an end of a respective one of said cords and adhesive for bonding said end of said cord in said hole to said screen.

9. The system of claim 4 wherein said screen includes a plurality of spaced apart pairs of holes formed through said screen inwardly adjacent said notch, said pairs of holes being adapted for the looping of said cord therethrough.

10. The system of claim 9 wherein said screen comprises a plurality of screens layered together, said looping of said cord through said pairs of holes holding said plurality of screens together.

11. The system of claim 10 wherein said looping of said cord can be loosened to allow a separation of said layered screens.

12. The system of claim 11 wherein each said frame member is adapted to receive at least partially therethrough connector means that extend from one frame member to a next adjacent frame member to rigidly connect said frame members together and to prevent relative rotation therebetween.

13. A system for retaining a video screen in a frame, comprising:
    a video screen having a front surface and a rear surface and a peripheral edge extending thereabout, said screen including a plurality of holes formed in said rear surface thereof at spaced apart intervals inwardly adjacent of said peripheral edge, said holes extending only partially through said screen from said rear surface towards said front surface;
    frame means for supporting said screen along at least a portion of said peripheral edge; and
    a plurality of biasing means extending between said screen and said frame means for resiliently biasing said peripheral edge of said screen against said frame means, each biasing means having a first end connectable to said frame means and a second end connectable to said screen, wherein said second end of each said biasing means is connectingly received into a respective one of said holes in said rear surface of said screen.

14. The system of claim 13 wherein said second end of each said biasing means is adhesively connected into its said respective hole in the rear surface of said screen.

15. The system of claim 14 wherein said means for resiliently biasing include tensioning member for pulling said screen against a contiguous portion of said frame means.

16. The system of claim 15 wherein said biasing means comprise said tensioning member and a length of cord connected thereto.

17. The system of claim 16 wherein said tensioning member is a spring.

18. The system of claim 17 wherein an end of said cord opposite the end thereof connected to said tensioning member is received into a respective one of said holes together with adhesive for bonding said cord to said screen.

19. The system of claim 18 wherein said peripheral edge of said screen includes a continuous notch formed therein adjacent said rear surface of said screen, said notch extending only partially through said screen from said rear surface towards said front surface, said notch being shaped to engage said frame means to locate said screen in said frame means.

20. The system of claim 19 wherein said frame means comprise frame members for assembly into a screen supporting frame, each frame member having an inner and an outer portion, said outer portion including a substantially planer flange having side surfaces and an outer edge surface, said outer edge surface and the contiguous portion of at least one of said surfaces being adapted to engage said notch in said screen.

21. The system of claim 16 wherein said cord is light transmitting.

22. A method of retaining a light transmitting screen in a frame defining an opening for said screen, comprising the steps of:

shaping the screen to fit in said frame opening, the screen having a front surface and a rear surface and a peripheral edge corresponding in shape to said frame opening;

forming a notch in said peripheral edge extending only partially through said screen from said rear surface towards said front surface thereof, said notch being shaped to engage said frame to locate said screen in said opening;

forming a plurality of spaced apart holes in said rear surface of said screen to extend peripherally around said screen inwardly adjacent to said notch; and applying a resilient biasing force between said frame and said screen so that said screen in held in position in said frame opening by biasing said notch against said frame, said biasing force being applied by means of a plurality of tensioning members, each of which is connected at one end thereof to said frame and at an opposite end thereof into a respective one of said holes in said rear surface of said screen.

23. A method of connecting a tensioner between a light transmitting screen and a frame supporting said screen, said tensioner having a first end connectable to the frame and a second end connectable to the screen, the method comprising the steps of:

forming a hole in said screen extending only partially therethrough from the back of the screen towards the front thereof;

inserting said second end of said tensioner into said hole with adhesive for bonding said second end of said tensioner to said screen; and connecting said first end of said tensioner to said frame whereby said tensioner pulls said screen against said frame.

* * * * *